Figure 1:
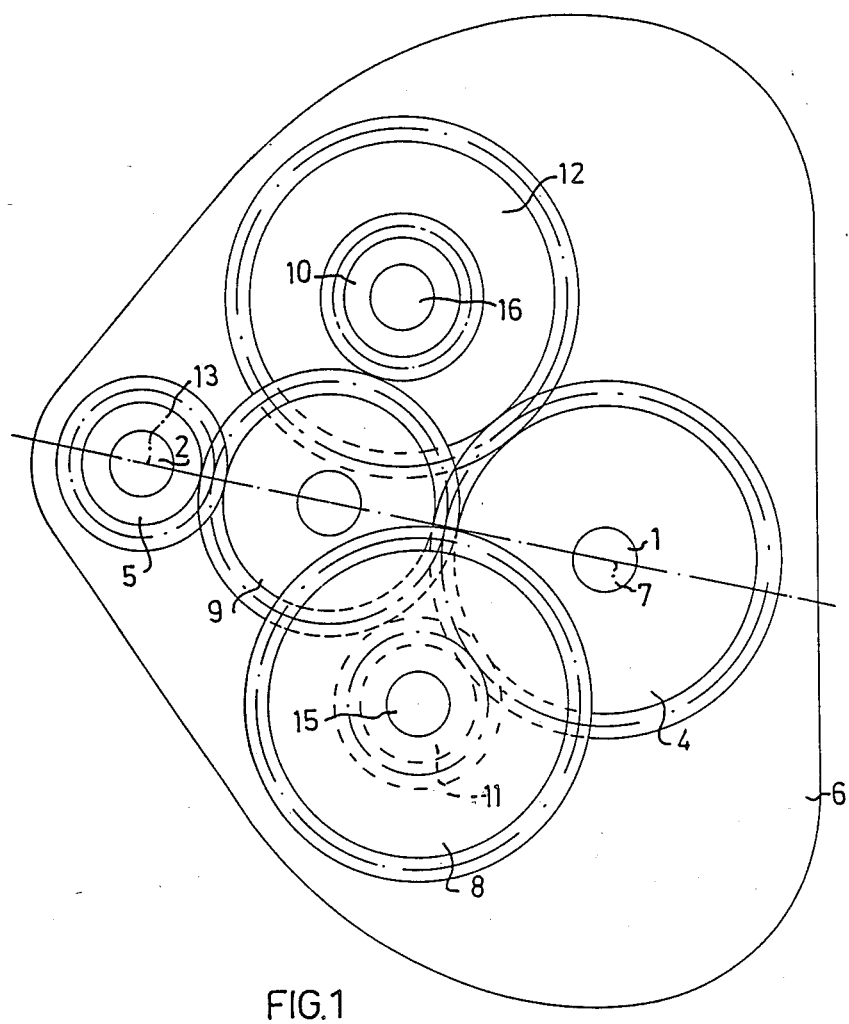

United States Patent [19]

Neuman

[11] Patent Number: 4,887,478
[45] Date of Patent: Dec. 19, 1989

[54] MULTIPLE-STEP GEAR DRIVE

[75] Inventor: Karl E. Neuman, Gräddö, Sweden

[73] Assignee: Neos Products HB, Karlsson, Neuman, Tamm, Sweden

[21] Appl. No.: 209,481

[22] PCT Filed: Dec. 9, 1986

[86] PCT No.: PCT/SE86/00558

§ 371 Date: Jun. 14, 1988

§ 102(e) Date: Jun. 14, 1988

[87] PCT Pub. No.: WO87/03662

PCT Pub. Date: Jun. 18, 1987

[30] Foreign Application Priority Data

Dec. 11, 1985 [SE] Sweden ............... 8505850

[51] Int. Cl.[4] ............... F16H 3/34
[52] U.S. Cl. ............... 74/354; 74/352; 74/329; 74/397
[58] Field of Search ............... 74/352, 353, 354, 329, 74/331, 384, 397

[56] References Cited

U.S. PATENT DOCUMENTS

| 209,833 | 11/1878 | Perrin | 74/353 |
| 276,463 | 4/1883 | Powell | 74/353 |
| 1,380,021 | 5/1921 | Robinson et al. | 74/354 X |
| 1,981,428 | 11/1934 | Schneider | 74/353 |
| 2,662,417 | 12/1953 | Mascherpa | 74/352 |
| 3,367,200 | 2/1968 | Cummings | 74/331 X |
| 4,315,438 | 2/1982 | Stephenson | 74/352 |
| 4,582,171 | 4/1986 | Jezierski | 74/354 X |

Primary Examiner—Rodney H. Bonck
Assistant Examiner—Christopher Campbell
Attorney, Agent, or Firm—Ostrolenk, Faber, Gerb & Soffen

[57] ABSTRACT

In a multiple-step gear drive there are two stationary toothed wheels, comprising a driving wheel and a driven wheel. Their spacing and positions remain constant as the housing that supports gear trains is rotated. For each gear step or position there is a gear train. Each train comprising one or several gear-wheels and in engagement with each other, all these gear-wheels being rotatably jounalled in a housing. The housing is movable substantially parallel to a plane running perpendicular to the shafts of the stationary toothed wheels, to be brought into a specific engagement position for each gear step in which the gear train is in engagement with both stationary toothed wheels. The housing and gear wheels are thus arranged so that in at least one gear step the housing can be disengaged from its engaged position in two substantially opposite directions, thus moving the corresponding gear train in the selected direction and thereby breaking the driving connection between the two stationary toothed wheels.

12 Claims, 4 Drawing Sheets

MULTIPLE-STEP GEAR DRIVE

The invention relates to a multiple step gear drive comprising a first stationary toothed wheel rotatable about a first shaft, a second stationary toothed wheel spaced from the first toothed wheel and rotatable about a second shaft, one gear train for each gear ste, each gear train consisting of a gear-wheel or of several drive-connected gear-wheels, all the gear-wheels being rotatably journalled in a housing movable substantially perpendicular tos aid first and second shafts to be brought into a specific engagement position of each gear step in which the gear train is in engagement with the first and second toothed wheels.

Conventional gear drives permitting multiple step gear changing generally comprise a plurality of parallel, rotatable shafts on which a number of toothed wheels are mounted to transmit driving torque. Some shafts are provided with axially displaceable gear-wheels, secured by splines, for instance, to prevent relative rotation. When changing gear, the gear-wheels are displaced along the shafts and brought into or out of engagement with axially immovable toothed wheels. Such gear drives require considerable space in all directions since there must be spaced both for the toothed wheels and for the above-mentioned displacement of the gear-wheels perpendicular to the main extension of the toothed wheels. It is therefore impossible to use such gear drives when the available space is relatively limited. Furthermore, this arrangement is rather complicated and expensive. The mechanism for moving the gear-wheels, for instance, must be executed with great precision, and the degree of complexity increases the more gear steps are included.

A multiple step gear drive is already known through SE-C-118 558. This is composed of a plurality of small gear drives, each corresponding to the gear defined in the introduction. This known gear thus comprises a drive and two gear-wheels housed in a housing pivotable about the pivot shaft of the drive. Rotation of the housing enables the gear-wheels to be brought into engagement with a totthed wheel secured on the driven shaft so that it cannot rotate. The gear-wheels engage one on each side of the connecting plane between the turning shaft of the housing and the pivot shaft of the driven shaft. When one of the gear-wheels is turned to engage, the other will be disengaged and vice versa. Only two gear changes are possible with a fixed axial position of the housing. In this known gear drive, the number of gear steps is increased by the housing and the gear-wheels also being displaceable parallel to the turning shaft and pivot shafts respectively. This type of gear drive with more than two steps thus takes up a considerable amount of space even in the axial direction of the toothed wheels and cannot therefore be used when the space available is limited.

The object of the present invention is to effect a multiple step gear drive comprising several gear steps but which takes up little space in one direction, while at the same time having a simple construction and consequently low manufacturing cost.

This is achieved in a gear drive of the type described in the introduction in that in at least one hear step the housing can be disengaged from its engaged position in two substantially opposite directions, thus moving the corresponding gear train in the selected direction and thereby breaking the driving connection between the first and second toothed wheels, established in said engagement position.

Figure 2:
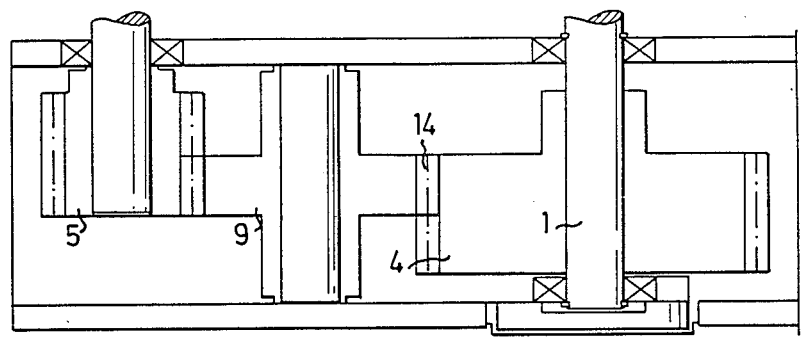
Figure 4:
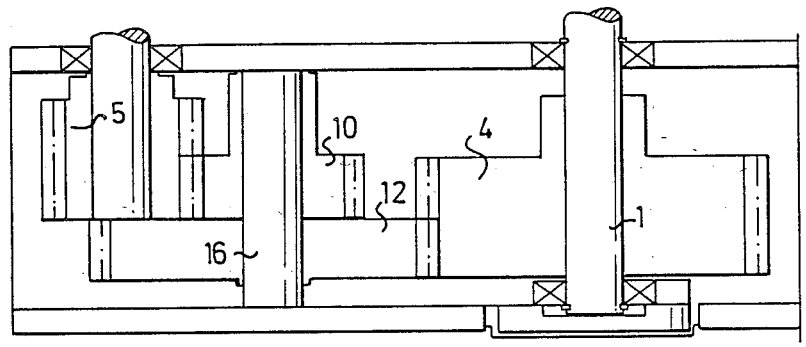
Figure 3:
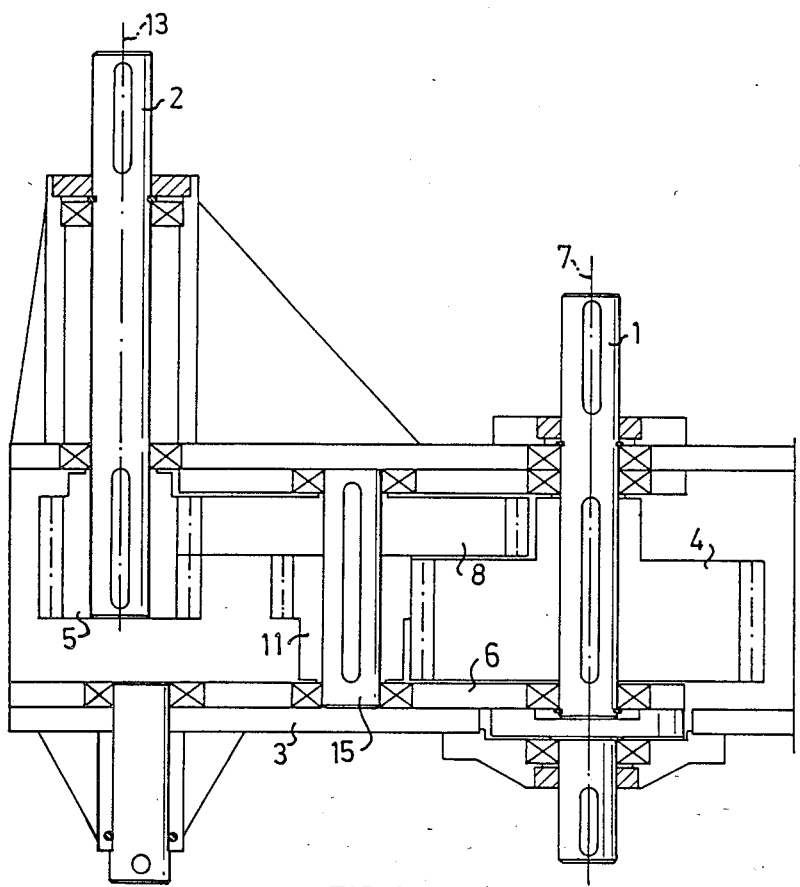
Figure 5:
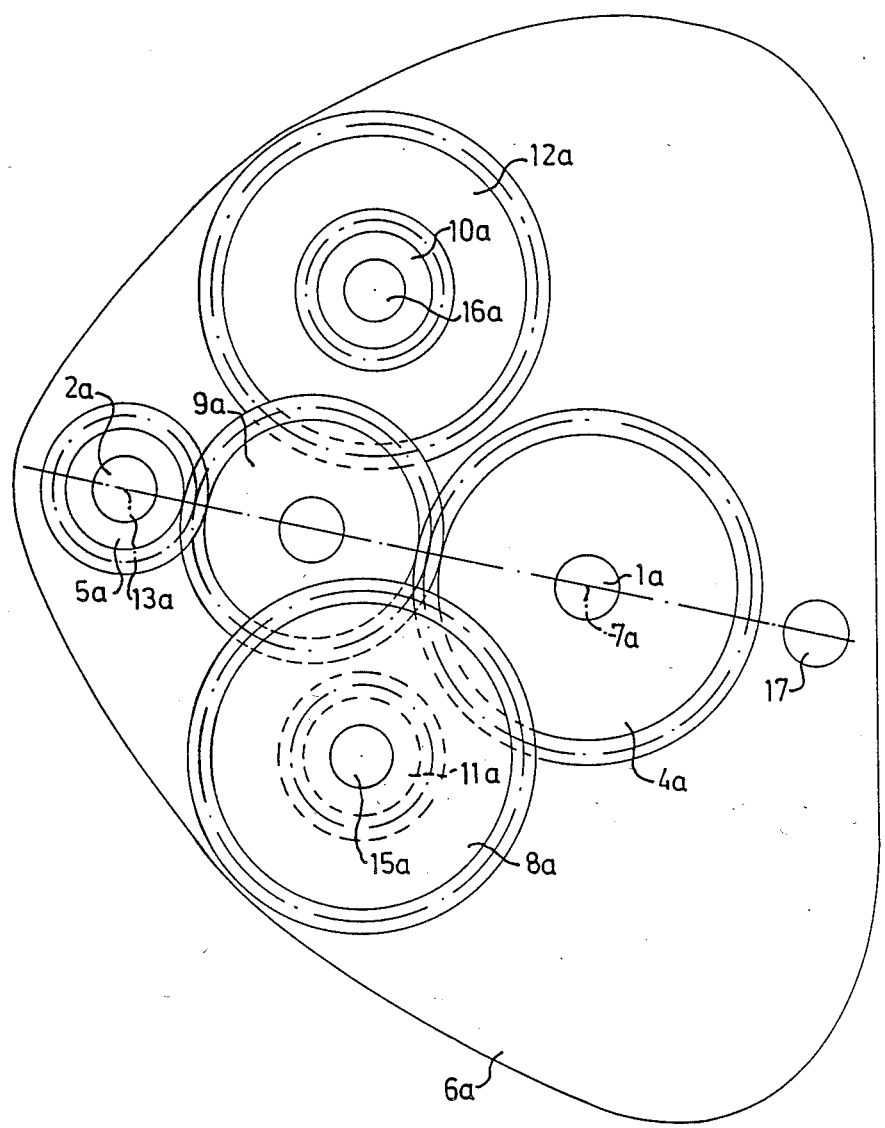

The invention will be described in more detail in the following with the aid of two embodiments and with reference to the accompanying drawings in which FIG. 1 shows schematically from above a first embodiment of a gear drive according to the invention, with certain components removed for the sake of clarity, FIG. 2 shows a longitudinal section along the line II—II in FIG. 1, with a first gear-wheel in engagement position, FIG. 3 shows a londitudinal section corresponding to that in FIG. 2, with a second gear-wheel in engagement position, FIG. 4 shows a longitudinal section corresponding to that shown in FIGS. 2 and 3, with a third gear-wheel in engagement position, and FIG. 5 shows schematically from above a second embodiment of a gear drive according to the invention with certain components removed for the sake of clarity.

The gear drive shown in FIGS. 1–comprises an non-movable in position but rotatable input shaft 1 and an nonmovable in position but rotatable output shaft 2, rotatably journalled in a gearbox 3. A gear drive 4 is immovably secured on the driving shaft 1 and a driven wheel 5 is similarly arranged on the driven shaft 2. A housing 6 is pivotably journalled in the gearbox 3. The turning axis of the housing 6 coincides with the pivot axis 7 of the driving wheel 4. Three gear-wheels 8, 9, 10 are rotatably journalled in the housing 6 and by turning the housing 6 each can be brought into or out of engagement with the driven wheel 5. In this embodiment the gear-wheels 8, 9, 10 are constantly in connection with the driving wheel 4, either directly like the gear-wheel 9 or via one or more intermediate gear-wheels 11, 12. The toothed wheels 11, 9 and 12, respectively, which are constantly in engagement with the driving wheel 4, describes a planetary movement about the driving wheel 4 when the housing 6 is turned. The gear-wheels 8, 9, 10 are so arranged in the housing 6 that when they are in engagement with the driven wheel 5, the pivot shafts of the gear-wheels 8, 9, 10 are in approximately the same plane as, that is, parallel to, the pivot axis 13 of the driven wheel 5 and the turning axis 7 of the housing 6, i.e. in each individual gear train, the gear-wheel 8, 9, 10 which is moved into engagement with the driven wheel is arranged in the housing so that the sum of the distance between the turning axis 7 of the housing 6, here coinciding with the pivot shaft of the driving wheel 4, and the pivot shafts of the gear-wheels 8, 9, 10 and the pitch radius of the gear-wheel, is equal to the distance between the turning axis 7 of the housing 6 and the pitch circle of the driven wheel 5, so that the gear-wheel 8, 9, 10 which is in engagement can be turned out of its engagement position in either of the two possible turning direction of the housing 6. If the housing is turned further in the selected direction, the gear-wheel will be moved arcuately from contact with the driven wheel 5 and if turning is continued, the adjacent gear train will be moved arcuately and come into engagement with the driven wheel 5. It will thus be seen that the housing is journalled to pivot about the axis 7 with respect to gear box 3.

FIG. 2 shows a sectional view of a gear step in which the gear wheel 9 is in direct communication with the driving wheel 4. The toothed rim of the driving wheel is approximately twice the width of the toothed rim 14 of the wheel 9 and above the toothed wheel 4 is a free space of approximately half the width of the toothed wheel 4. The gear-wheel 9 is rotatably journalled in the housing 6 pivotable about the pivot axis 7 of the driving wheel 4 and is arranged to engage with the upper half of the toothed rim of the driving wheel 4. There is thus a free space on either side of the gear-wheel 9, this space being approximately as high as the toothed rim 14 is wide. The toothed wheel 9 engages on the lower half of the toothed rim of the driven wheel 5, this rim being approximately twice as wide as the rim 14. Below the driven wheel 5 is a free space approximately half as high as the width of the rim of the driven wheel 5. The driven wheel 5 is secured to a driven shaft projecting into the gearbox and is unable to pivot on this shaft. In the position shown in FIG. 2, torque is transmitted from the driving shaft 1 to the upper half of the driving wheel 4, over the gear-wheel 9, on to the lower half of the driven wheel 5 and finally to the driven shaft 2.

In the position shown in FIG. 3 the gear-wheel 11 engages with the upper half of the driving wheel 4. The width of the gear-wheel 11 is approximately half that of the rim of the driving wheel 4. The gear-wheel 11 is secured so that it cannot turn on a shaft 15 journalled in the pivotable housing 6. Gear-wheel 8 is arranged above gear-wheel 11 and is also secured to the shaft 15 so that it cannot turn. Gear-wheel 8 is approximately the same width as gear-wheel 11 but its diameter is considerably larger. In the position shown gear-wheel 8 has been moved arcuately and engages the upper half of driven wheel 5 and partially overlaps both the directly coupled gear-wheel 9 and the driving wheel 4. The various elements are of course spaced to allow movement without friction. The torque is transmitted from the upper half of the toothed rim of driving wheel 4 to gear-wheel 11, via shaft 15 to gear-wheel 8, from this to the upper half of the rim of driven wheel 5 and finally to the driven shaft 13.

In the third gear step shown in FIG. 4 a gear-wheel 12, approximately half as wide as the driving wheel 4, has been moved arcuately and engages the lower half of the driving wheel 4. The gear-wheel 12 is secured in a manner preventing it from turning, to a shaft 16 rotatably journalled in the housing 6. A gear-wheel 10, approximately the same width as the gear-wheel 12 but considerably smaller in diameter, is also arranged on the shaft 16. Gear-wheel 10 engages with the lower half of driven wheel 5. Gear-wheel 12 is then below the driven wheel 5 and the gear-wheel 9 and is partially overlapped by these but without being touched by them. The torque is transmitted from the lower part of driving wheel 4 to gear-wheel 12, over to shaft 16 and then to gear-wheel 10 from where it is transmitted to driven shaft 13 via the lower part of the toothed rim of driven wheel 5.

The gear drive shown in this first embodiment comprises three steps. However, as should be evident from FIG. 1, it takes up only about one third of the available space around the driving wheel 4 and could therefore be provided with considerably more steps.

Furthermore, the three gear trains in FIG. 1 are in permanent engagement with the driving wheel 4. The gear trains are turned to their engagement positions by gear-wheels 11, 9, 12 which describe a planetary movement about the driving wheel 4. This arrangement gives an extremely compact, space-saving construction although at a cost of somewhat reduced efficiency.

However, it is not necessary for the gear trains to be permanently in engagement with the driving wheel. In the embodiment shown in FIG. 5 the gear trains consisting of gear-wheels 10a, 12a, 9a, 11a, 8a are turned with the aid of the housing 6a into and out of engagement simultaneously with both driving wheel 4a and driven wheel 5a. The turning shaft 17 of housing 6a is thus arranged in a line with the pivot shafts 1a and 2a of driving and driven wheel but spaced therefrom. In each gear train, therefore, the gear-wheel 8a, 9a or 10a which is moved into engagement with the driven wheel 5a is so arranged in the housing 6a that the sum of the distance between the pivot shaft of this gear-wheel, the turning shaft 17 of the housing 6a and the pitch radius of the gear-wheel is equal to the distance between the turning shaft 17 of the housing 6a and the pitch circle of the driven wheel 5a. The gear-wheel 11a, 9a, 12a which is brought into engagement with the driving wheel 4a is arranged so that the difference between the distance between the pivot shaft of this gear-wheel and the turning shaft 17 of the housing 6a and the pitch radius of the gear-wheel is equal to the distance between the turning shaft 17 and furthermost point of the pitch cicle of the driving wheel 4a. In engagement position parts of the gear-wheels 8a, 9a, and 12a overlap each other and also the stationary wheels 4a, 5a in approximately the same way as in the first embodiment shown. The section through the engagement positions agrees substantially with the sections shown in FIGS. 2–4 for the first embodiment of the gear drive. Only the addition of "a" to the designations in Figures 2–4 is necessary for them to be applicable to the engagement positions shown in the second embodiment.

The advantages of this latter arrangement is that it offers space for considerably more gear steps than in the first embodiment and that the losses will be low since only one gear train at a time engages with the driving wheel 4a instead of all of them.

In both embodiments the housing 6, 6a is locked in the various engagement positions with the aid of an appropriate locking mechanism 18 between the housing 6 and the gear box 3 of any known type which may be used to lock the housing 6, 6a in its selected positions. When changing gear the locing mechanism is released and the housing 6 then turned so that the current gear train breaks the connection between driving wheel 4, 4a and driven wheel 5, 5a. The housing then continues turning so that the desired gear train comes into engagement position and the housing is then locked in relation to the gearbox 3.

In order to obtain reverse function in a torque-transmitting gear train, two or more intermediate shafts, provided with gear-wheels, may be rotatably journalled in the housing.

Furthermore, the gear-wheels arranged on the same intermediate shaft may be made in one piece in the form of a double gear-wheel, instead of as individual gear-wheels as shown in the example.

It is not necessary for all gear trains to be able to be turned past their engagement positions. Instead, the first and/or the last gear train may be arranged to engage with the driving wheel 4, 4a and driven wheel 5, 5a in an area located at the side of the connecting plane defined by the pivot shafts 1, 1a and 2, 2a, respectively, of the toothed wheels.

It should be evident that torque transmission may be performed in the opposite direction to that described above, i.e. the toothed wheel 5, 5a constitutes the driving wheel from which torque is transmitted to the shaft 1, 1a which thus becomes the driven shaft.

I claim:

1. A multiple-step gear drive comprising a first stationary in position but rotatable toothed wheel and a first rotatable shaft on which the first toothed wheel is mounted; a second stationary in position but rotatable toothed wheel spaced from the first toothed wheel and a second rotatable shaft on which the second toothed wheel is mounted, a respective gear train for each gear step, each gear train comprising at least one drive-connected gear, a housing in which all the gears are rotatably journalled and the housing being movable substantially arcuately with reference to the first shaft for the housing to be brought into a respective specific engagement position for each gear step, and at each gear step the respective gear train is in simultaneous contact with the first and second toothed wheels; the first and second toothed wheels being spaced at a preset distance apart the gear trains being sized and shaped for enabling the selective contact of each one of the gear trains with both of the first and second wheels at the respective gear step, wherein in at least one gear step, the housing can be disengaged from its engagement position and can be moved selectively in two substantially opposite directions for moving the corresponding gear train in a selected direction and thereby breaking the driving connection between the first and second toothed wheels established in the engagement position.

2. A gear drive according to claim 1, wherein the housing is pivotable about an axis parallel to the shafts of the first and second toothed wheels.

3. A gear drive according to claim 2, wherein the pivot axis of the housing coincides with one of the first and second shafts.

4. A gear drive according to claim 2, wherein the pivot axis of the housing, the first shaft and the second shaft are parallel and are aligned in a common plane parallel to the shafts and is arranged in line with and spaced from the first and second toothed wheel shafts.

5. A gear drive according to claim 1, comprising at least three gear steps.

6. A gear drive according to claim 1, wherein at least one gear train comprises two gear-wheels in engagement with each other.

7. A gear drive according to claim 1, wherein the gear train for at least one gear step comprises two gear-wheels with different diameters arranged one above the other with coinciding pivot shafts and secured together to prevent rotation in relation to each other, one of said gear wheels when in engagement position being in driving engagement with one of the stationary toothed wheels, while the other gear-wheel in engagement position is in driving connection with the other stationary toothed wheel.

8. A gear drive according to claim 7, wherein one of the gears with coinciding pivot shafts overlaps or, as seen in axial direction, is overlapped by a gear wheel in one of an adjacent gear train and one of the stationary toothed wheels.

9. A gear drive according to claim 7, wherein the gear-wheels with coinciding pivot shafts are executed in one piece to define a double toothed wheel.

10. A gear drive according to claim 1, comprising a locking mechanism by means of which the housing can be locked in its various engagement positions.

11. A multiple-step gear drive comprising a first gear having a first axis and rotatable about the first axis; a second gear, spaced from the first gear, having a second axis and rotatable about the second axis, the first and the second gears are rotatable while being in mutually fixed positions;

a respective gear train for each gear step, each gear train comprising at least one drive-connected gear;

a housing in which the gears of the gear trains are rotatably journalled, the housing being movable substantially arcuately with reference to the first axis for being brought into a specific engagement position for each gear step; in each gear step, the respective gear train is in simultaneous contact with the first and the second gears, in at least one gear step in the specific engagement position, the minimum distance between the first and the second gears corresponds to a length dimension of the gear train between the first and second gears, and the housing being displacable in either of two opposite directions in an arcuate movement path out of the engagement position around the first axis, for bringing an adjacent one of the gear trains on the housing into the specific engagement position with both the first and the second gears.

12. A multiple-step gear drive according to claim 11, wherein the housing is pivotable around the first axis.

* * * * *